(12) United States Patent
Yoshioka

(10) Patent No.: US 6,985,717 B1
(45) Date of Patent: Jan. 10, 2006

(54) EMERGENCY INFORMING APPARATUS AND AN EMERGENCY INFORMING SYSTEM

(75) Inventor: Kenji Yoshioka, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 462 days.

(21) Appl. No.: 09/534,441

(22) Filed: Mar. 24, 2000

(30) Foreign Application Priority Data

Mar. 31, 1999 (JP) ................................. 11-094287

(51) Int. Cl.
H04M 11/04 (2006.01)
(52) U.S. Cl. .................... 455/404; 455/421; 455/456.1
(58) Field of Classification Search ................ 455/404, 455/521, 456
See application file for complete search history.

(56) References Cited

U.S. PATENT DOCUMENTS

| | | | | |
|---|---|---|---|---|
| 5,555,286 A | * | 9/1996 | Tendler | 379/355.03 |
| 5,742,666 A | * | 4/1998 | Alpert | 340/426 |
| 5,832,394 A | * | 11/1998 | Wortham | 455/419 |
| 5,914,675 A | * | 6/1999 | Tognazzini | 340/426 |
| 5,918,180 A | * | 6/1999 | Dimino | 340/825.5 |
| 5,963,129 A | * | 10/1999 | Warner | 340/10.42 |

FOREIGN PATENT DOCUMENTS

WO    WO98/06229    2/1998

* cited by examiner

Primary Examiner—Nay Maung
Assistant Examiner—Sujatha Sharma
(74) Attorney, Agent, or Firm—Louis Woo

(57) ABSTRACT

An ordinary telephone communication circuit is provided in addition to the emergency informing circuit in an emergency informing apparatus. In the non-emergency condition, ordinary telephone communication is provided through a wireless communication network. In the emergency condition, the emergency data is transmitted to a predetermined station through the wireless communication network. An interface for transmitting and receiving data is further provided. A data converter for converting data may be provided as a data communication adapter. An automatic dialing circuit may be provided. An emergency informing system including the emergency informing apparatus, the wireless network, and a terminal of a predetermined station for receiving the emergency data from the emergency informing apparatus is also disclosed.

4 Claims, 7 Drawing Sheets

US 6,985,717 B1

EMERGENCY INFORMING APPARATUS AND AN EMERGENCY INFORMING SYSTEM

BACKGROUND OF THE INVENTION

1. Field of the Invention

This invention relates to an emergency informing apparatus mounted on a vehicle for informing emergency condition data, position data, and identification data of the vehicle in response to a command signal and an emergency informing system including the emergency informing apparatus.

2. Description of the Prior Art

An emergency informing apparatus mounted on a vehicle for informing emergency condition data, position data, and identification data of the vehicle in response to a command signal is known. Such a prior art emergency informing apparatus informs a police, etc. of at least emergency condition data, position data, and identification data of the vehicle in response to a switch.

However, though the prior art emergency informing apparatus includes a wireless telephone communication circuit, it cannot be used for general personal communication.

SUMMARY OF THE INVENTION

The aim of the present invention is to provide a superior emergency informing apparatus and superior emergency informing system.

Moreover, the aim of the present invention is to provide communication in a non-emergency condition with the emergency informing apparatus.

According to the present invention there is provided a first emergency informing apparatus for a vehicle including: a position detecting unit for detecting a position of the emergency informing apparatus in response to a command signal. The first emergency informing apparatus further includes a data generation unit including a memory for generating emergency data including at least identification data of the vehicle from the memory, called party data from the memory, and the position data in response to the command signal. The first emergency informing apparatus further includes a wireless telephone communication unit including: an emergency communicating unit for making a call with the called party data and transmitting the emergency data to a called party indicated by the called party data in response to the command signal; and an ordinary communication unit for providing telephone communication with a desired party in response to a calling demand and telephone communication with a calling party in response to a call from the calling party; and a controlling unit for operating the emergency communication unit when the command signal is exist and operating the ordinary communication unit when the command signal is inexistent.

The first emergency informing apparatus may further include an interface unit for interfacing the ordinary communication unit with an external unit.

Moreover, in this case, a data converting unit for converting data in the telephone communication between the interface unit and the telephone communication unit may be further provided.

The first emergency informing apparatus may further include an automatic dialling unit for registering telephone number data and supplying the calling demand and one of the registered telephone number data to the ordinary communication unit to provide the telephone communication.

The first emergency informing apparatus may further include a hands-free communication unit for providing sound communication between a user and the ordinary communication unit.

According to the present invention there is provided an emergency informing system including: a wireless telephone network including a base station; and an emergency informing apparatus for a vehicle and a predetermined unit for receiving and outputting the emergency data from a telephone communication unit of the emergency informing apparatus via the wireless telephone network.

The emergency informing apparatus includes: a position detecting unit for detecting a position of the emergency informing apparatus in response to a command signal; a data generation unit including a memory for generating emergency data including at least identification data of the vehicle from the memory, called party data from the memory, and the position data in response to the command signal; and a telephone communication unit. The telephone communication unit includes: an emergency communicating unit for making a call with the called party data and transmitting emergency data to a called party indicated by the called party data in response to the command signal; and an ordinary communication unit for providing telephone communication with a desired third party in response to a calling demand and with a third calling party in response to a call from the third calling party; and a controlling unit for operating the emergency communication unit when the command signal is exist and operating the ordinary communication unit when the command signal is inexistent.

BRIEF DESCRIPTION OF THE DRAWINGS

The object and features of the present invention will become more readily apparent from the following detailed description taken in connection with the accompanying drawings in which.

The same or corresponding elements or parts are designated with like references throughout the drawings.

DETAILED DESCRIPTION OF THE INVENTION

First Embodiment

Figure 1:
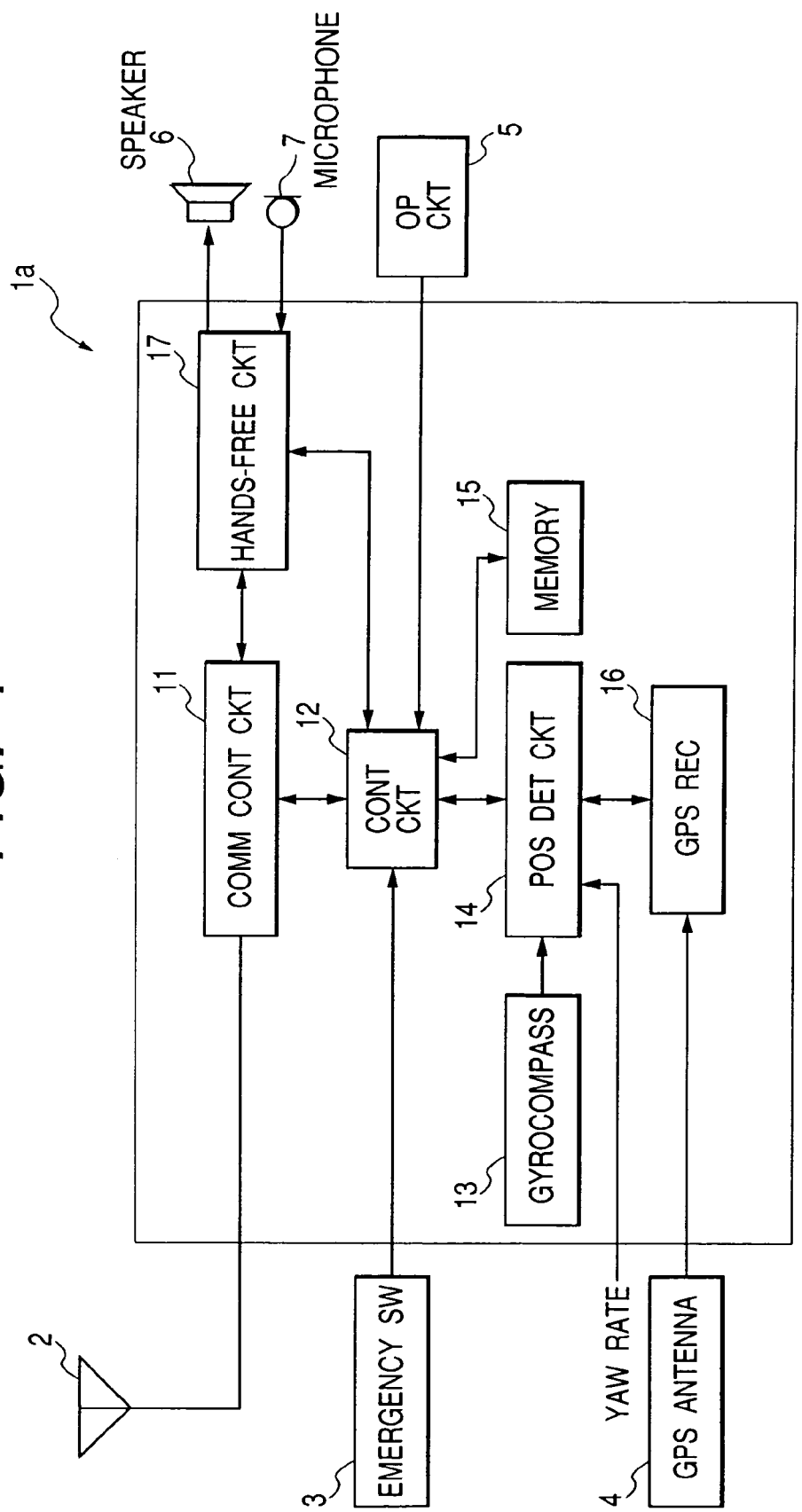
FIG. 1 is a block diagram of an emergency informing apparatus according to a first embodiment of this invention.

FIG. 1 is a block diagram of an emergency informing apparatus 1a according to a first embodiment of this invention.

The emergency informing apparatus 1a is mounted on a vehicle. The emergency informing apparatus 1a includes an emergency switch 3 for generating a command signal to inform a predetermined unit (station) of an emergency condition, a GPS antenna 4 for receiving a GPS signal, a control circuit (microprocessor) 12 for executing controlling to respective circuits in the emergency informing apparatus 1a, a communication control circuit (wireless telephone communication control circuit) 11 for controlling communication with a third party including a predetermined unit (station) such as a terminal in a police station through an antenna 2 via a base station under controlling by the control circuit 12, a gyrocompass 13 for detecting a compass direction of the vehicle, a GPS antenna 4 for receiving the GPS signal, a GPS receiver 16 for calculating its position from the received GPS signal, a position data detection circuit 14 for detecting position data from the GPS receiver 16, the gyrocompass 13, and a yaw rate indicative of a direction changing rate, a memory 15 for storing data indicating occurrence of emergency, a registered number of the vehicle (identification data of the vehicle), called party data such as a telephone number of police, and the name data of the owner of the vehicle.

Moreover, the emergency informing apparatus 1a includes an operation circuit 5 for supplying an operation signal such as a dial signal to the control circuit 12, a hands-free circuit 17, a speaker 6, and a microphone 7. The hands-free circuit 17, the speaker 6, and the microphone 7 provide the hands-free communication through the communication control circuit 11 and the antenna 2.

The emergency informing apparatus 1a mounted on a vehicle is used for informing a request for a patrol car, an ambulance car, or a fire engine truck on a motorcar accident or a sudden illness. When a motorcar accident or a sudden illness occurs, the driver depresses the emergency switch 3. In response to this, the emergency informing apparatus 1a automatically makes a call to a police or an emergency information center or the like and transmits data indicating occurrence of (kinds of) emergency, the present position of the vehicle, data of the registered vehicle in response to the emergency switch 3. Moreover, the emergency may be detected by a shock sensor, a thermal sensor, etc.

The control circuit 12 recognizes occurrence of emergency in response to the emergency switch 3. Then, the control circuit 12 supplies a position information demanding signal to the position data detecting circuit 14 and reads called party data, i.e., a telephone number of a police station, etc., identification data of this vehicle and the data of the owner of this vehicle from the memory 15. The control circuit 12 generates emergency data including data indicating occurrence of emergency, the present position data, and the identification data of this vehicle to supply the emergency data to the communication control circuit 11.

The communication control circuit 11 makes a call to the predetermined station and when the called party responds the call, i.e., link has been established, the communication control circuit 11 transmits the emergency data via the antenna 2 to a near base station of a wireless telephone network. Further, the emergency data may be forwarded to the station through a public switched telephone network.

The gyrocompass 13 detects the compass direction of the vehicle. The GPS antenna 4 receives a GPS signal and the receiving circuit 16 calculates the present position of the vehicle using the GPS signal. The position data detection circuit 14 receives the compass direction of the vehicle and the present position of the vehicle from the GPS receiving circuit 16. Moreover, the position data detection circuit 14 receives a yaw rate signal from the vehicle to detect a travelling direction. The position data detection circuit 14 supplies the position data including the present position, the compass direction, and the travelling direction to the control circuit 12.

Moreover, the control circuit 12 receives a communication request from the operation circuit 5. That is, the operation circuit 5 generates an OFF-HOOK signal and a dial signal in response to operation by a driver. The control circuit 12 makes a call to a desired party with the dial signal through the communication control circuit 11 and the antenna 2 when the control circuit does not detect the emergency condition.

Further, the control circuit 12 receives a communication request from the communication control circuit 11. That is, the communication control circuit 11 receives a call from a calling party through a wireless communication network, and the antenna 2. When the link has been established, the control circuit 12 operates the communication control circuit 11 and the hands-free communication circuit 17 to provide voice communication with the speaker 6 and the microphone 7 when the control circuit 12 does not detect the emergency condition.

When the control circuit 12 detects the emergency condition during the voice communication, the control circuit 12 disconnects the link and makes a call to the predetermined station to inform the emergency condition.

The hands-free communication circuit 17 provides the hands-free voice communication with the speaker 6 and the microphone 7 by howling cancelling and echo cancelling operations.

The control circuit 12 operates the communication control circuit 11, the position detection circuit and the memory 15 to provide the emergency communication portion in response to the emergency switch 3 and operates the communication control circuit 11, the hands-free circuit 17 and the operation circuit 5 to provide an ordinary (non-emergency) communication portion.

Second Embodiment

Figure 2:
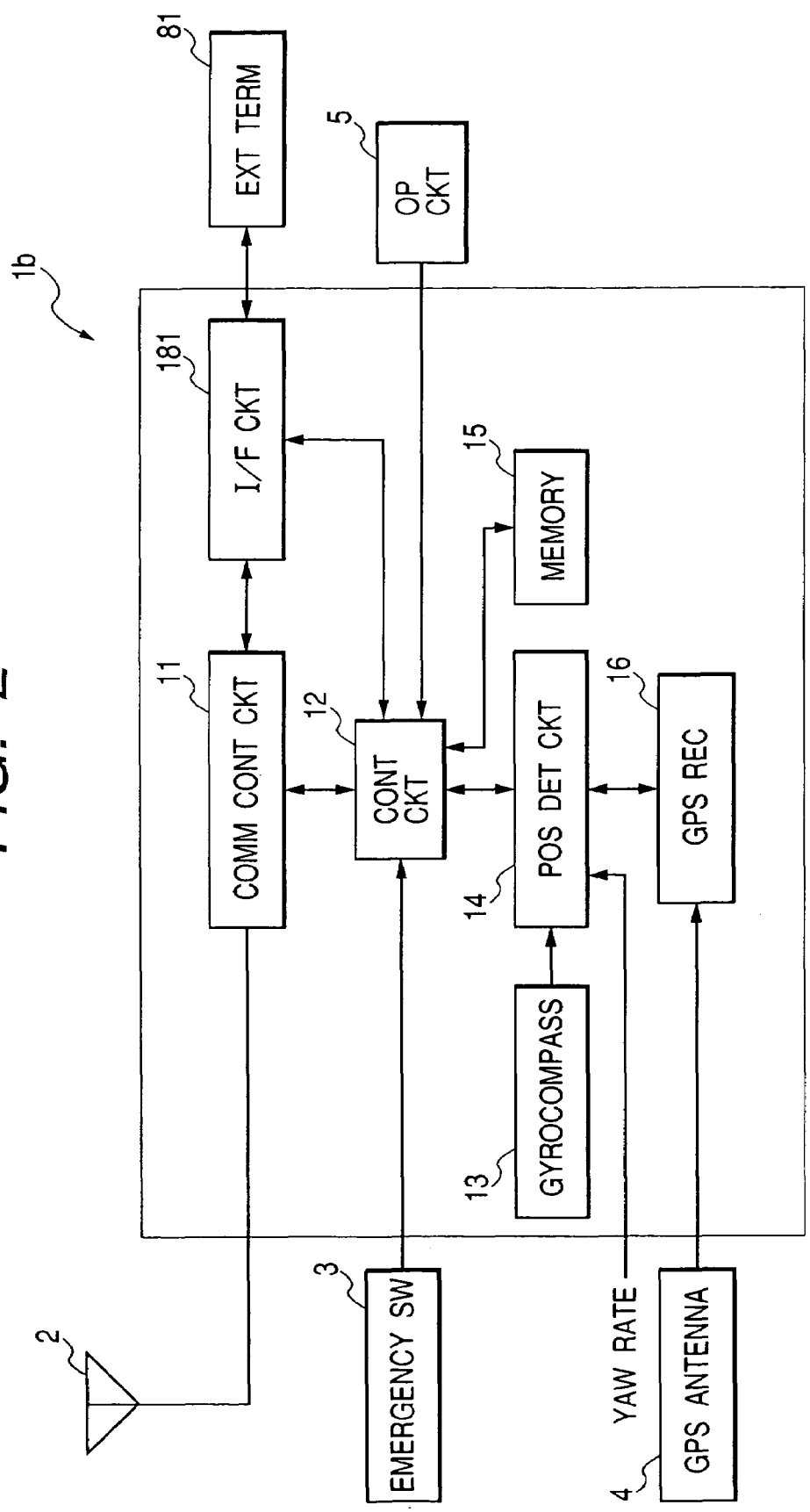
FIG. 2 is a block diagram of an emergency informing apparatus according to a second embodiment of this invention.

FIG. 2 is a block diagram of an emergency informing apparatus 1b according to a second embodiment of this invention.

The structure of a second embodiment is substantially the same as that of the first embodiment. The difference is that an interface circuit 181 replaces the hands-free circuit 17 and the control circuit 12 controls the interface circuit 181. The interface circuit 181 provides interfacing between the communication control circuit 11 and an external terminal 81.

The external terminal 81 generates and supplies a dial signal to the communication control circuit 11 through the interface circuit 181 in response to a request to provide data communication and voice communication with the external terminal 81.

When the control circuit 12 receives the dial signal from the external terminal 81 through the interface circuit 181, the control circuit 12 makes a call to a third party with the dial signal from the external terminal 81 when the control circuit 12 does not detect an emergency condition.

Further, when the communication control circuit 11 receives a call from a calling party through a wireless communication network and the antenna 2 and if the link has been established, the communication control circuit 11 provides data communication or voice communication with the external terminal 81 when the control circuit 12 does not detect an emergency condition.

When the control circuit 12 detects an emergency condition during the data communication or the voice communication, the control circuit 12 interrupts the communication and disconnects the link and makes a call to the predetermined station to inform the emergency condition as mentioned above.

The communication between the emergency informing apparatus 1b and the network is provided with a general cellular phone system. The communication between communication circuit 11 to the external terminal 81 is performed using sixteen-wire interface signal to provide the voice communication and the data communication.

In this embodiment, the interface circuit 181 is provided, so that the external terminal 81 can perform communication controlling through the interface circuit 181.

Third Embodiment

Figure 3:
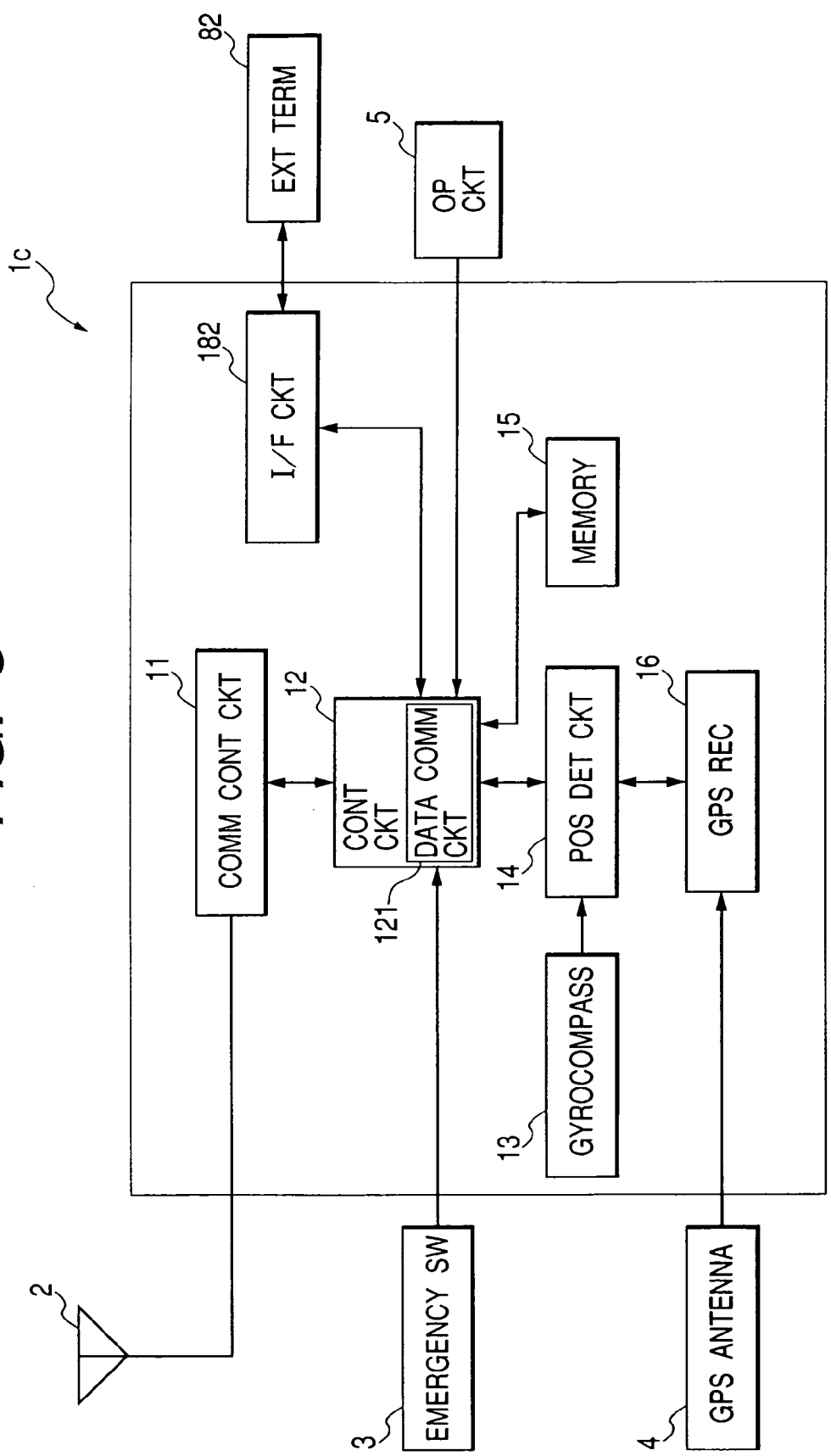
FIG. 3 is a block diagram of an emergency informing apparatus according to a third embodiment of this invention.

FIG. 3 is a block diagram of an emergency informing apparatus 1c according to a third embodiment of this invention.

The structure of a third embodiment is substantially the same as that of the second embodiment. The difference is that a data communication circuit (program) 121 is further provided in the control circuit (microprocessor) 12 and an interface circuit 182 replaces the interface circuit 181. The data communication circuit 121 converts the control signal such as the AT commands (developed by Hayes Microcomputer Products) and data from the control circuit 12 into data to be outputted by the communication control circuit 11 and converts data from the communication control circuit 11 to the control circuit 12 into the data having a data format which is recognized by the control circuit 12. This function is the same as that by the general data communication adapter. The interface circuit 182 provides connection to supply control signals and data such as the AT command used for modem controlling to the data communication circuit 121.

Operation of the third embodiment will be described. The control circuit 12 enters a normal (ordinary) communication mode in the condition other than the emergency condition. When data communication is requested, the external terminal 82 sends a communication request to the control circuit 12. That is, the external terminal 82 generates and supplies a dial signal to the data communication circuit 121 in response to operation by a driver. The data communication circuit 121 makes a call to a third party with the dial signal through the communication control circuit 11 and the antenna 2 when the control circuit 12 does not detect the emergency condition. When the link has been established and the communication condition is established, the data communication circuit 121 informs the external terminal 82 through the interface circuit 182 that the link and the communication condition have been established. Then, the external terminal 82 performs data transmission to the data communication circuit 121. The data communication circuit 121 converts or modulates the data to be transmitted by the communication control circuit 11. The communication control circuit 11 transmits the data from the data communication circuit 121.

When the communication control circuit 11 receives data from the antenna 2, the data communication circuit 121 converts or demodulates the received data into the data to be supplied to the external terminal 82.

Further, the control circuit 12 receives a communication request from the communication control circuit 11. That is, the communication control circuit 11 receives a call from a calling party through a wireless communication network, and the antenna 2. When the link has been established, the control circuit 12 operates the communication control circuit 11 and the interface circuit 182 to provide voice or data communication with the external terminal 82 when the control circuit 12 does not detect the emergency condition.

When the control circuit 12 detects the emergency condition during the voice or data communication, the control circuit 12 disconnects the link and makes a call to the predetermined station (unit) to inform the emergency condition.

If the communication between the emergency informing apparatus and the network is provided with a cellular phone system, the communication between communication control circuit 11 and the data communication circuit 121 is performed using sixteen-wire interface signal. Moreover, the communication between the data communication circuit 121 and the external terminal 82 is provided with the modem interface signal such as the AT command.

As mentioned above, the data communication circuit 121 is further provided as the general data communication adapter or a modem. Moreover, the interface circuit 182 for connecting the data communication circuit 121 to the external terminal 82 is provided. Accordingly, the external terminal 82 can access to the data communication circuit 121 in the ordinary (non-emergency) condition.

In this embodiment, the data communication circuit 121 is provided, so that the external terminal 82 can supplies data communication command to the data communication circuit 121 to access the data communication circuit 121 to provide data communication.

Fourth Embodiment

Figure 4:
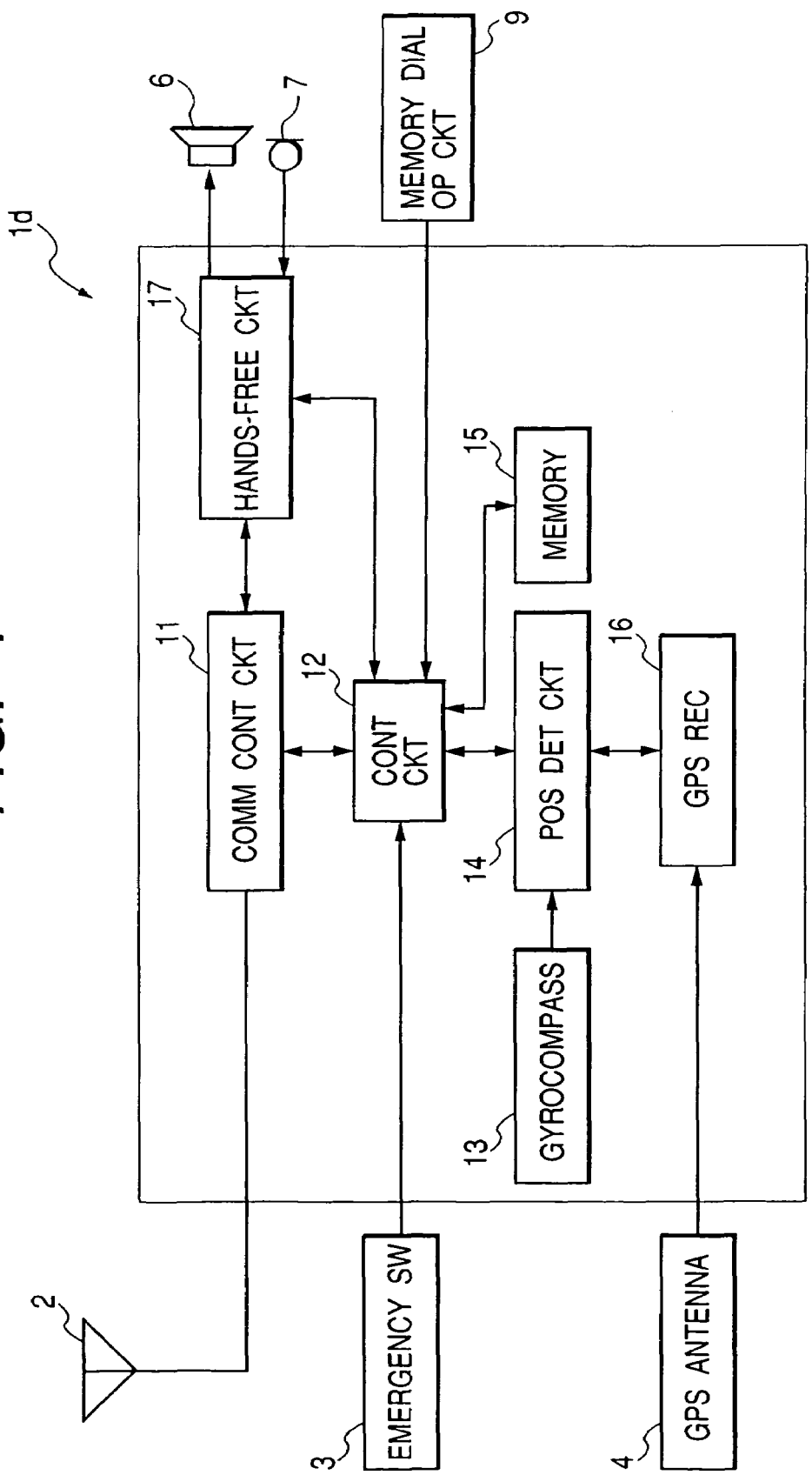
FIG. 4 is a block diagram of an emergency informing apparatus according to a fourth embodiment of this invention.

FIG. 4 is a block diagram of an emergency informing apparatus 1d according to a fourth embodiment of this invention.

The structure of a fourth embodiment is substantially the same as that of the first embodiment. The difference is that a memory dial operation circuit 9 replaces the operation circuit 5. The memory dial operation circuit 9 generates the dial signal in response to the driver or the user. Moreover, the memory dial operation circuit 9 registers telephone numbers and automatic dialing signal for generating one of the dial signals directed to one of the registered telephone numbers.

The driver or the user operates the memory dial operation circuit 9 to input a plurality of sets of telephone number data, the registering number, and the name into the control circuit 12. The control circuit 12 stores the data in the memory 15.

The memory dial operation circuit 9 includes a display such an LCD to display data of the registered telephone numbers and the registered names.

When the driver or the user makes the automatic calling, the driver operates the memory dial operation circuit 9. In response to this, the memory dial operation circuit 9 reads the registered telephone number data or the corresponding registered name from the memory 15 via the control circuit 12. The user watches the displayed image and selects one of the registered name or the registered telephone numbers. In response to this, the control circuit 12 reads the selected registered telephone number data and makes a call with the selected telephone number data.

Moreover, the control circuit 12 receives a communication request from the communication control circuit 11. That is, the communication control circuit 11 receives a call from a calling party through a wireless communication network, and the antenna 2. When the link has been established, the control circuit 12 operates the communication control circuit 11 and the hands-free communication circuit 17.to provide voice communication with the speaker 6 and the microphone 7 when the control circuit 12 does not detect the emergency condition.

When the control circuit 12 detects the emergency condition during the voice communication, the control circuit 12 disconnects the link and makes a call to the predetermined station to inform the emergency condition.

Moreover, if a connector is provided between the memory dial operation circuit 9 and the control circuit 12, the memory dial operation circuit 9 is detachable. Further, the interface circuit 181 in the third embodiment may be connected to the control circuit 12 with a connector, so that the data communication can be provided with the connector.

Moreover, the memory 15 may be provided in the communication control circuit 11.

Modifications will be described.

Figure 5:
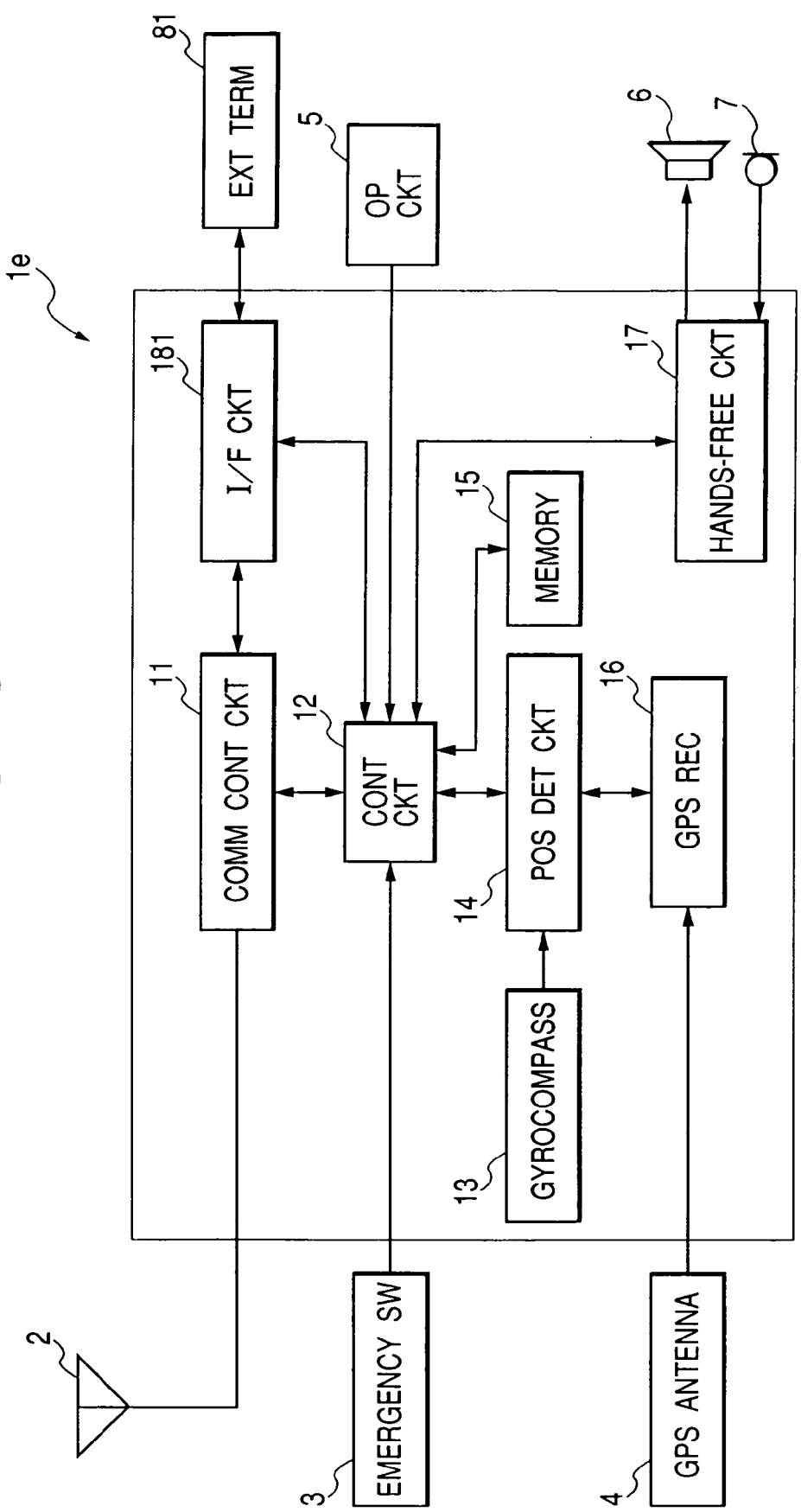
FIGS. 5 and 6 are block diagrams of modifications of this invention.
Figure 6:
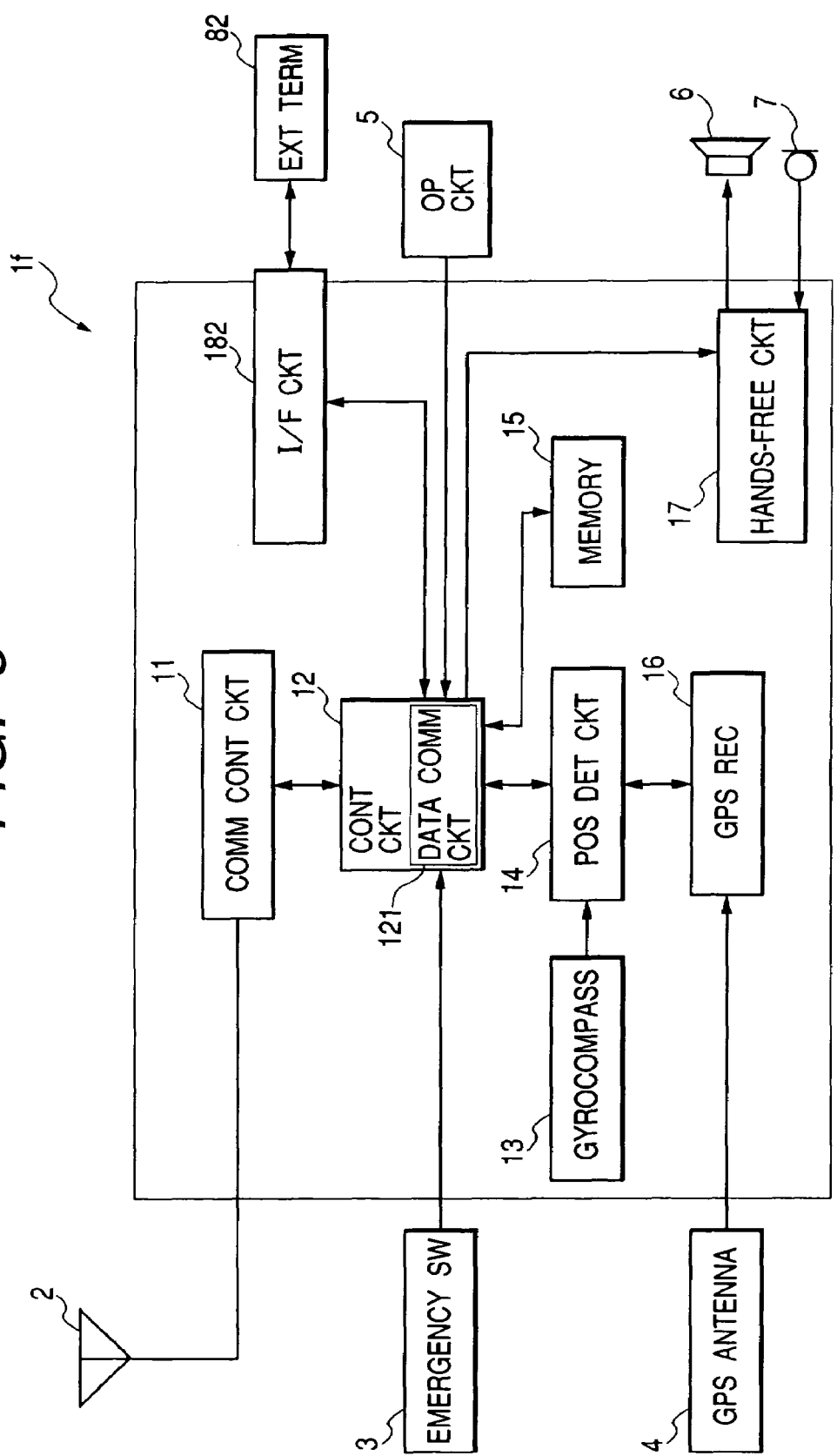

FIGS. 5 and 6 are block diagrams of modifications of this invention. The emergency informing apparatus shown in FIG. 5 shows combination of the first embodiment and the second embodiment. That is, the hands-free circuit 17, the speaker 6, and the microphone 7 are further provided to the emergency informing apparatus shown in FIG. 2.

The emergency informing apparatus shown in FIG. 6 shows combination of the first embodiment and the third embodiment. That is, the hands-free circuit 17, the speaker 6, and the microphone 7 are further provided to the emergency informing apparatus shown in FIG. 3.

Figure 7:
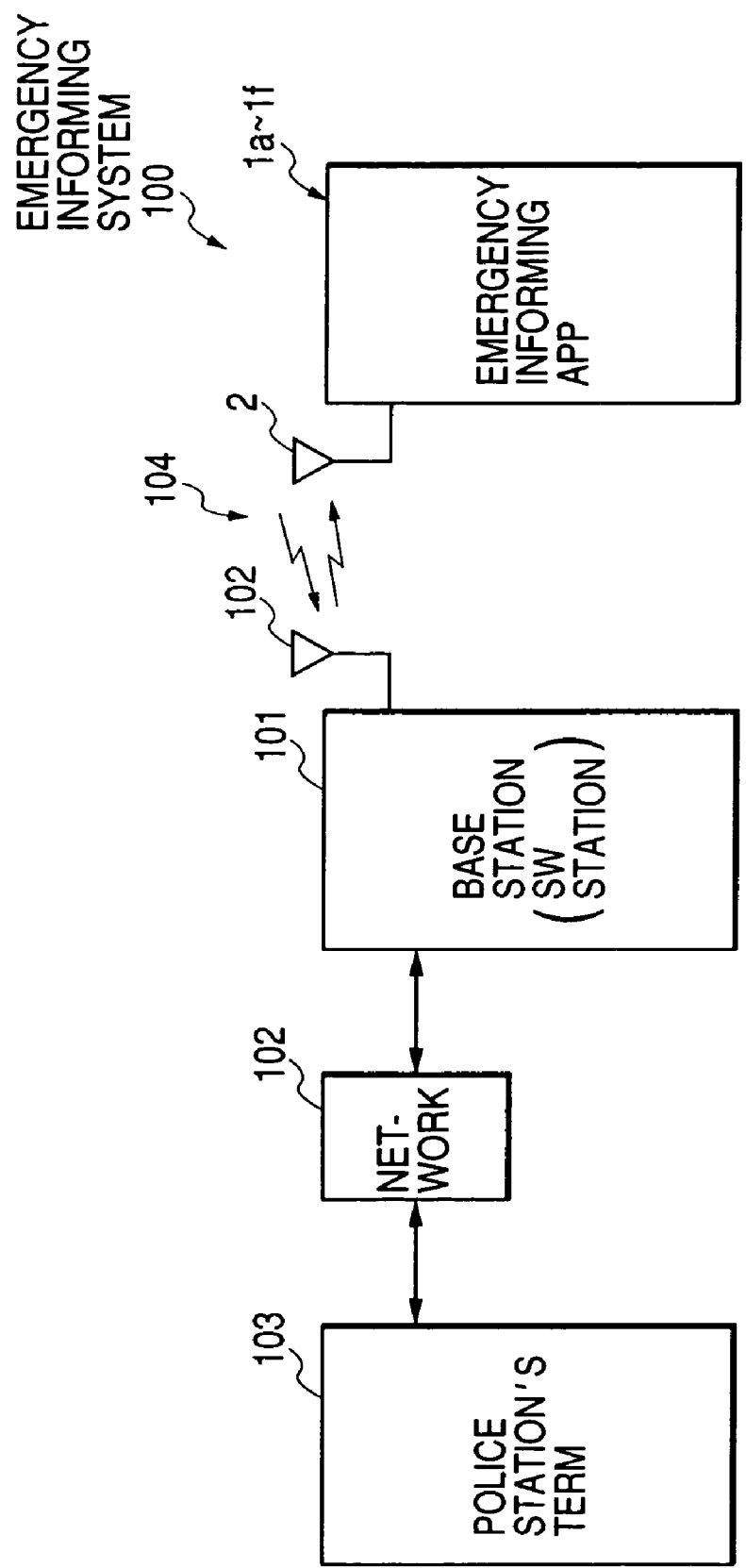
FIG. 7 is a block diagram of an emergency informing system of this invention including the emergency informing apparatus.

FIG. 7 is a block diagram of an emergency informing system of this invention including the emergency informing apparatus mentioned above. The emergency informing system includes an emergency informing apparatus 1a, 1b, 1c, 1d, 1e, or 1f, a wireless communication network 104, a wired communication network 102 such as PSTN, and a predetermined station to be called when emergency occurs, such as a police station.

When an emergency condition occurs, the emergency informing apparatus 1a, 1b, 1c, 1d, 1e, or 1f transmits emergency data to the nearest base station (switch station) 101 of the wireless network 104, the base station forwards the emergency data to a terminal 163 of the predetermined station through the wired communication network 102. The terminal of the predetermined station may be coupled with a special transmission line or a special wireless line.

What is claimed is:

1. An emergency informing apparatus for a vehicle comprising:

A position detection unit for detecting a position of said emergency informing apparatus;

A data generation unit for generating emergency data including at least identification data of said vehicle, called party data and said position;

An emergency communication unit for making a wireless communication and transmitting said emergency data to a called party indicated by said called party data when an emergency condition is detected; and A control unit for operating said emergency communication unit, wherein said control unit operates said emergency communication unit for making an ordinary communication with a desired party when an emergency condition is not detected;

Wherein said emergency informing apparatus is mounted to and is part of said vehicle; and Wherein said emergency informing apparatus is configured to effect said ordinary communication without said position detecting unit and/or said data generation unit having to be disconnected; and Wherein said emergency communication unit further makes an ordinary communication with a desired party, and said control unit disconnects ordinary communication of said emergency communication unit when an emergency condition is detected, and operates said emergency communication unit for making an emergency communication with said called party.

2. An emergency informing apparatus for a vehicle comprising:

a position detecting unit for detecting a position of said emergency informing apparatus;

a data generation unit including a memory for generating emergency data including at least identification data of said vehicle, at least one emergency called party, and the position from said memory;

a communication unit for allowing a user in said vehicle to communicate telephonically with a desired party when there is no emergency and for communicating with said emergency called party and transmitting said emergency data to said emergency called party when there is an emergency;

an operation circuit for operating said communication unit to effect a telephonic link with said desired party when a communication request is input to said operation circuit by at least one of said user and the desired party; and a control unit for operating said communication unit to disconnect the link to said desired party if said user is communicating with said desired party when an emergency is detected, and to connect to and inform said emergency called party of the emergency.

3. The emergency informing apparatus of claim 2, wherein said emergency apparatus is mounted to said vehicle.

4. The emergency informing apparatus of claim 2, further comprising:

a switch which when activated by said user causes said control unit to operate said communication unit to transmit to said emergency called party at least data indicative of the occurrence of the emergency.

* * * * *